Figure 1:
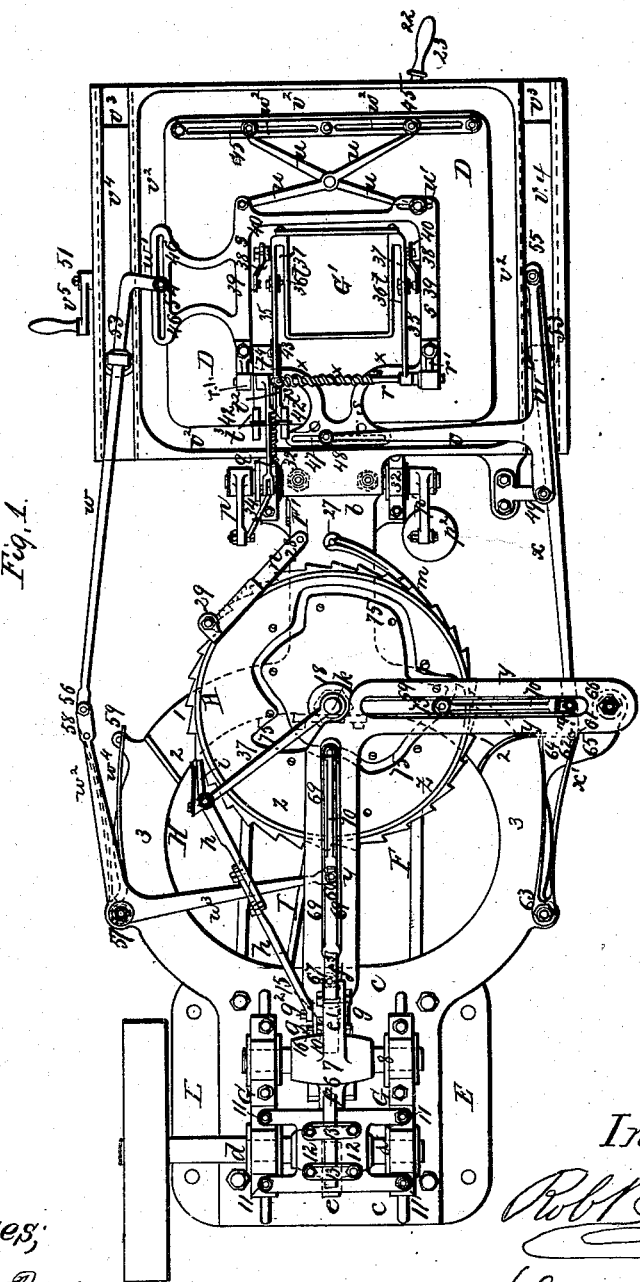

5 Sheets—Sheet 1.

R. B. RUGGLES & L. W. SERRELL.
MACHINE FOR BEATING GOLD.

No. 8,642. Patented Jan. 6, 1852.

Witnesses;
Geo. W. Reid
C. Tineclwt

Inventor;
Rob't B Ruggles
Lemuel W. Serrell

5 Sheets—Sheet 2.

R. B. RUGGLES & L. W. SERRELL.
MACHINE FOR BEATING GOLD.

No. 8,642. Patented Jan. 6, 1852.

Witnesses:
Geo. W. Reid
C. Tincelint

Inventor,
Robt B Ruggles
Lemuel W. Serrell

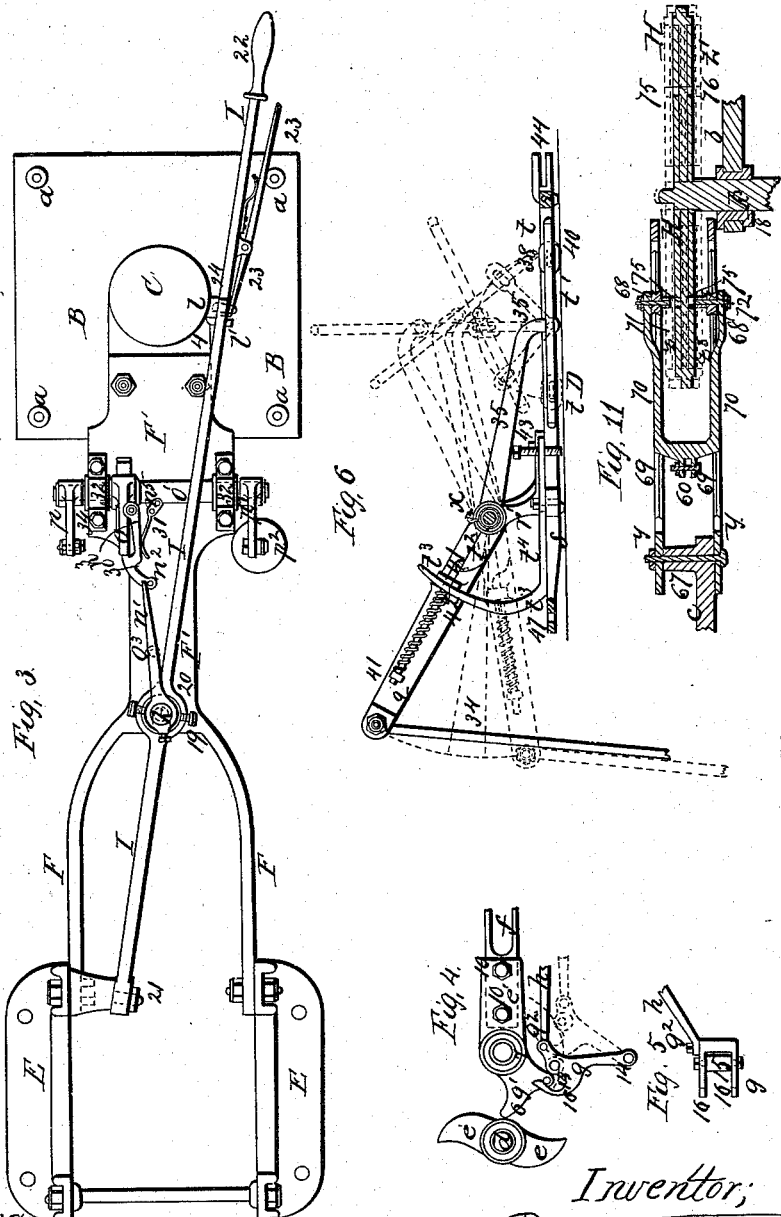

5 Sheets—Sheet 4.
R. B. RUGGLES & L. W. SERRELL.
MACHINE FOR BEATING GOLD.
No. 8,642. Patented Jan. 6, 1852.
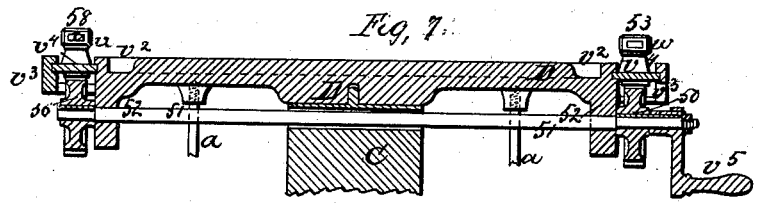
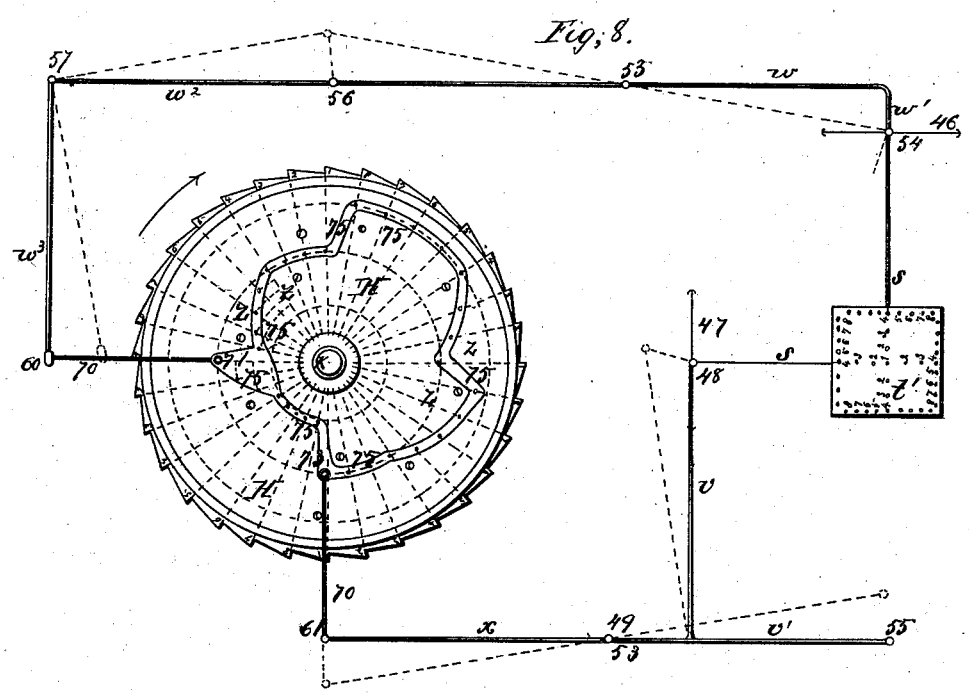
Witnesses:
Geo. W. Reid
C. Timbut
Inventor;
Robt B Ruggles
Lemuel W Serrell

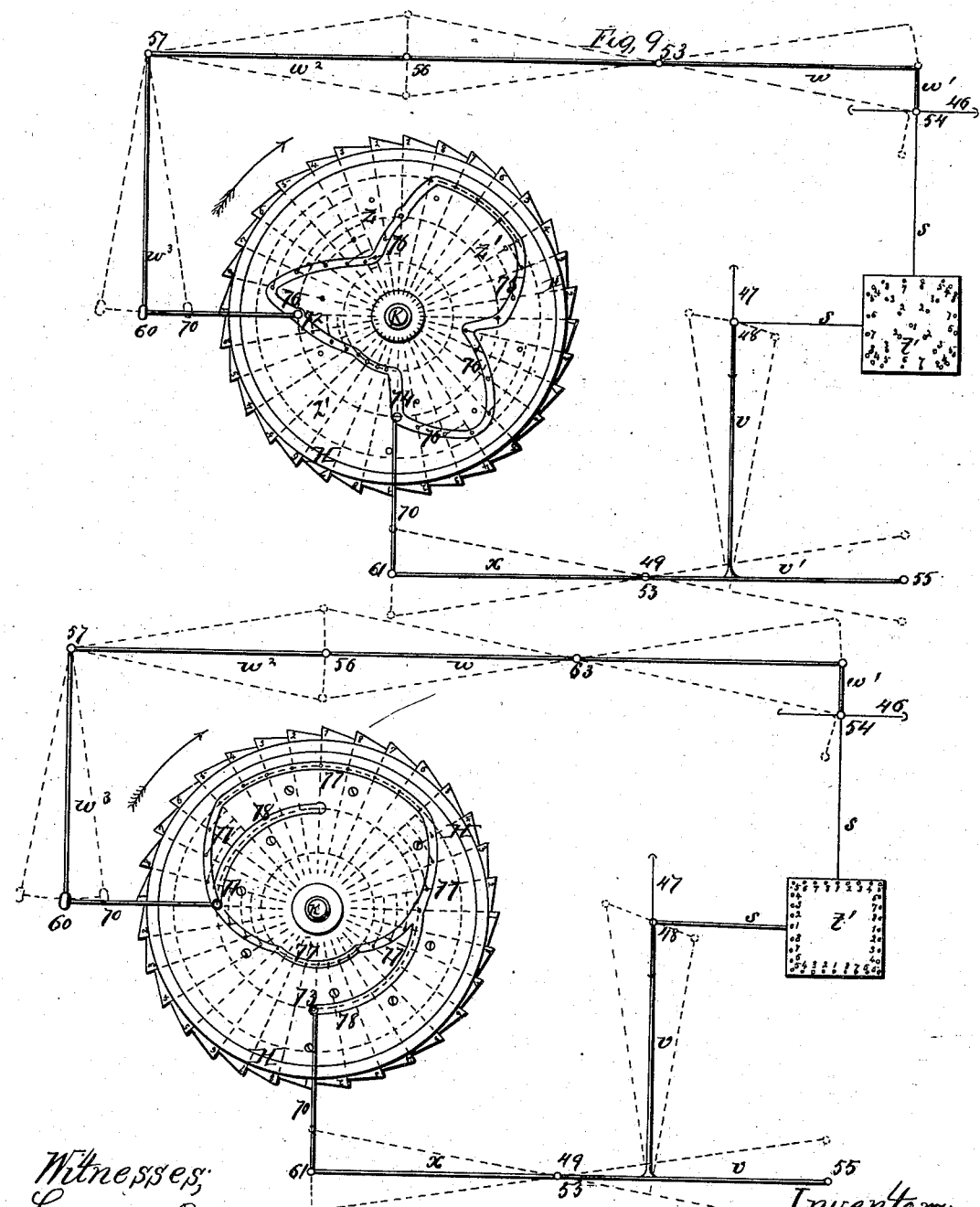

UNITED STATES PATENT OFFICE.

ROBERT B. RUGGLES AND LEMUEL W. SERRELL, OF NEW YORK, N. Y., ASSIGNORS TO ROBT. B. RUGGLES.

MECHANICAL GOLD-BEATER.

Specification of Letters Patent No. 8,642, dated January 6, 1852.

*To all whom it may concern:*

Be it known that we, ROBERT B. RUGGLES, gold-beater, and LEMUEL W. SERRELL, mechanical draftsman, both of the city of New York, have invented, made, and applied to use certain new and useful Improvements in the Construction of Machinery for Beating Gold and other Malleable Metals into Thin Plates or Leaves; and we do hereby declare that the following is a full, clear, and exact description of the construction, operation, and effect of the said machine, reference being had to the annexed drawing, making part of this our specification.

We would first premise, that the objects of our invention is, to furnish means for beating lamina of metal, by machinery, in a manner corresponding exactly with the operations effected by the ordinary hand process; and as the operations performed by this machine are numerous, we shall divide the same into classes, for the easier understanding of the whole process, as follows: First, a cursory description of the hand process, this being necessary to the full understanding of the same process, when effected by this machine. Second, the hammer, and parts connected, to give the motion similar to the human arm, in beating with the hammer. Third, the means used, to lift the mold containing the lamina of metal from the anvil, and turn the same over, replacing it with the opposite face resting on the anvil, termed herein, the "turn over motion." Fourth, the means of giving an extended motion to the mold, so as to cause a given number of blows of the hammer to be struck on a greater area, so as to follow up the plates, or leaves of metal, as they are extended in size. Fifth, the means used, to cause the blows of the hammer to fall on the right place on the mold, whether beating what is called the "center motion", the "diagonal motion", or the "planing motion"; these various characters of beating being necessary, for the perfecting of the operation. Sixth, the variations which are the mere equivalents of the mechanical means herein described; some of these variations have been used, but we believe the entire machine, herein described and shown, to be the best and most perfect in arrangements and operation. Seventh, disclaimers and claims.

We would here remark, that although the operations, for the sake of clearness, are divided, the parts are combined together, to form only *one* complete machine.

*First—the ordinary hand process.*—The gold beater skins, properly prepared with lime in the usual manner, or proper leaves of animal parchment, receive thin square plates of metal in their center, and these skins and metal, when placed together form what is usually called the "mold", this is covered with bands of parchment, to keep the "mold" together.

The beating is commenced in the center, and the mold turned over, about every thirty two blows; and when the metal has commenced to extend itself, it will usually split at the middle of each side; the workman then commences beating one blow in the center, and beats out on the center line, toward the middle of one side, as far as the metal is extended to; and then beats on the line of the side, toward the corner; so proceeds with all four sides, striking about thirty two blows on the side, and then turns the mold over, the object of this beating being, to carry out the corner, diagonally, thicker than the other part, so that the next style of beating shall cause the leaf of metal to be of an even thickness. This next style of beating is to commence in the center, and beat out diagonally to the corner, and then along one side, thus proceeding all around the mold, striking, in all cases, about thirty two blows on one side, and then turning the mold over, and beating on the other side, and extending the area of the beating, as the metal is extended; this diagonal beating causing the leaf or plate of metal, to be nearly square, and of an even thickness. This first beating, from the roller plate, is called the "cutch", and extends the metal to about four times its original area, forming what is called "foil"; this is then to be divided into quarters, and beat in precisely the same manner as before described; this is called beating the "shoder", and when extended to about four times the area at first, is again quartered, and beat in what is usually termed the "mold" into "leaf."

It will be now borne in mind, that this machine effects all these operations, the same means being required for each; and the term "mold" is used herein, to avoid repetition, in all the processes, whether beating the "cutch", the "shoder", or the "mold", to form the leaf; and also is applied, in what is termed the "planing", that is, placing the gold beater skins between paper, and then beating the mold thus formed, all around the edges, and either decreasing or extending the area of beating, so as to beat evenly all over the surface; the object of this "planing", being to clean the skins, in the usual manner. And the workman, during all the processes has to "rifle" the mold, that is, working it in his hands, so as to separate the skins, and let the atmosphere penetrate, so as to prevent the skins sticking together; and during the process of beating gold, it is necessary to anneal it, by heat, in the usual manner, to make it tough, and cause it to work easily.

The various operations set forth in the foregoing, with the exception of the "rifling", and "annealing", are all performed by our machine, and by bearing in mind the hand process, the understanding of the operations, and uses, of the various parts of this machine, will be much facilitated.

Figure 2:
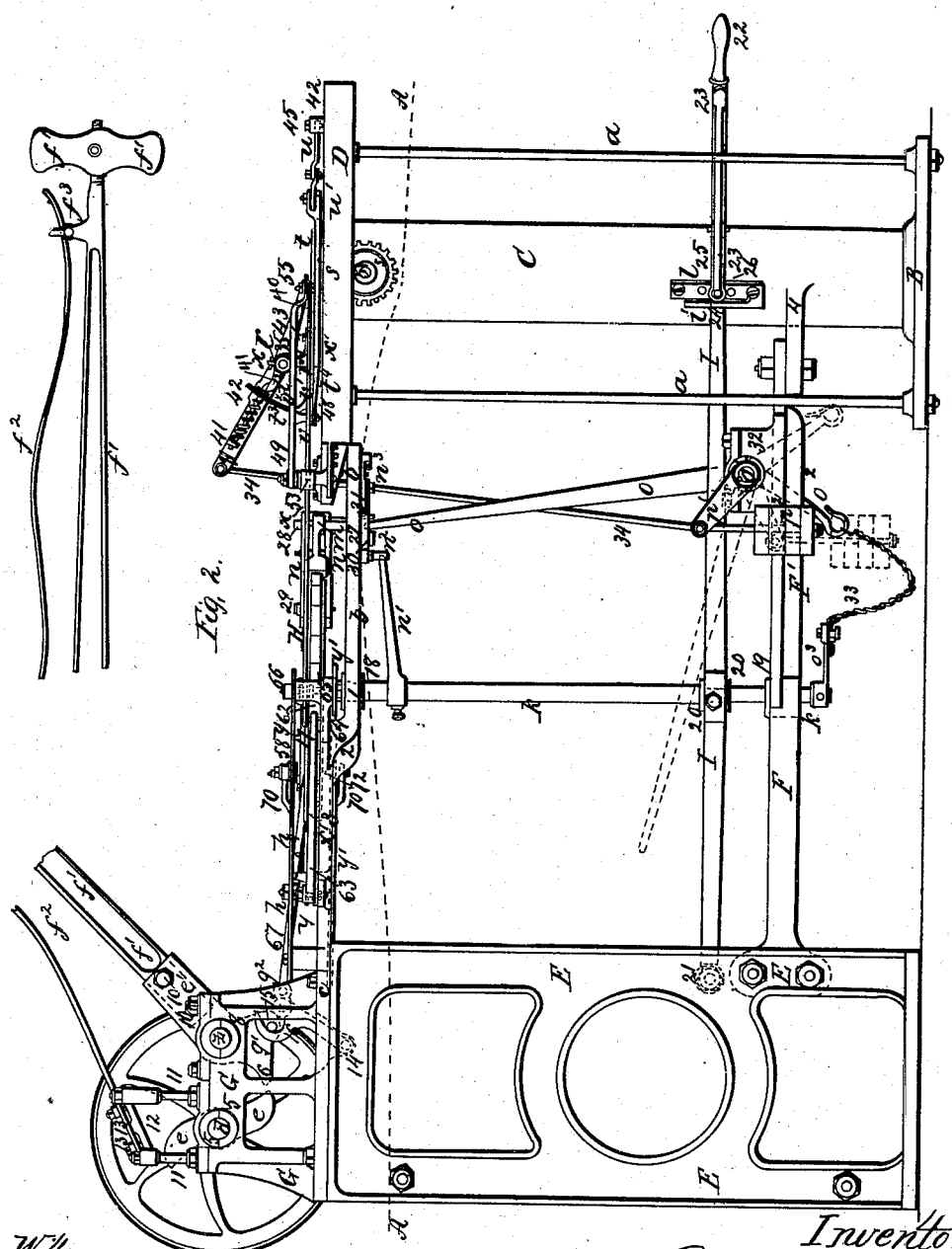

*Second—the hammer.*—In the accompanying drawing Figure 1, is a general plan of the complete machine, but with the hammer head and handle removed, to show the parts beneath; Fig. 2, is a complete side elevation; Fig. 3, is a plan of all the parts, below the line A, A, of Fig. 2; Fig. 4, is a sectional elevation of the hammer tail and cam, the other figures are separately referred to, hereafter; and the same letters and numbers, as marks of reference, denote the like parts in all the figures.

B, is a bed plate, turned flat in the center, with a hole to receive the steady pin of a vertical column, C, fitted to take an even bearing on the plate B, and beneath the anvil D, which is a flat smooth plate, of proper size and thickness; and on this the mold is laid, and retained, or placed, in its proper position, to receive the blows of the hammer; $a$, $a$, are rods, screwed into the anvil D, having nuts beneath the bed plate B, to permanently connect the bed plate B, to the anvil D. The plate B, is set on a proper foundation, to make the machine secure; $b$, is a part of the top bed frame, attached to the under side of the anvil, at the back, and is formed as a fork 1, which rises at the part 2, to the level of the anvil, and is connected by a curved fork 3, to the bed plate $c$, of the hammer. This plate $c$, is sustained on a frame E.

F, is a fork, bolted to the frame E, and connected to a center piece F′, that is attached to the column C, by a flanch 4.

On the plate $c$, are two vertical side frames, G, with journals 5, carrying the main shaft $d$, to which competent power is applied to rotate it, and the power should be so regulated by conical drums, or pulleys, as to increase or decrease the speed, as may be required. $e$, is a cam, on the shaft $d$, between the frames G, having one, two or more projections, but here shown as two, to operate on, and depress the projection, or cam $b$, which is formed with the boss 7, which has trunnions on a shaft set in journals 8, in the frame G; $e'$, is a socket on the boss 7, which receives the hammer handle $f$, which may be of wood, or metal, but here shown as of metal; and 10, 10, are bolts and nuts, to secure the handle into the socket, the socket being formed as a three sided box, has a slight swell on the inside of the back, between the bolts 10, so that by tightening the bolts 10, the other end of the hammer handle, with the hammer $f'$, is adjusted horizontally, which, with the handle of the correct length, causes the hammer $f'$, when it falls, to strike on the center of the anvil D, precisely over the center of the column C, and consequently in the center of the mold, when properly placed on the anvil. $f^3$, is a roller, or may be a plate, on the upper side of the hammer handle, which, when the hammer is raising up, takes a spring $f^2$, that is supported by a plate 12, sustained on a continuation of the bolts 11, of the journal box 5, and the spring $f^2$, is secured by bolts 13, and adjusted to give the required pressure, in any usual manner.

India rubber, or other proper springs may be used, to send the hammer down, and the operation of this part is, that the points of the cam $c$, taking the projection $b$, of the hammer tail, as the cam and shaft rotate in the direction of the arrow, raise the hammer, and this, taking in its ascent the spring $f^2$, bends it upward, and as soon as the point of the cam $c$, clears the projection $b$, falls with an accelerated velocity and force, aided by the spring $f^2$; and the hammer striking on the mold, rebounds, which rebound is followed up, by the cam $c$, causing the hammer to compress the spring $f^2$, as before, and when the machine is running very fast, the accelerated velocity of the hammer, in ascending, will sometimes cause the point $b$, to jump away from the cam $c$, but this is taken by the spring $f^2$, which, in its turn, sends the hammer down, with a force, and speed, proportioned to the point to which the hammer has compressed the spring, before its momentum was overcome; so that the hammer requires free play, without any other checking motion than the spring, the cam always causing the hammer to rise high enough, on slow motions. This operation on the hammer being similar to a man's arm, which carries the hammer high enough, and then pulls it down, though in beating fast, the elasticity of the mold is such, as to cause the hammer to ascend by the rebound, the power being applied to send it down.

*Third—the "turn over motion."*—The mold has now to be turned over, every certain number of blows of the hammer; which, herein, is every thirty two blows, but may be more, or less, although we prefer and use that number.

Through the bed plate $c$, is a mortise, with ears on the under side of the plate, to receive a bolt 14, forming the journal of a vibrating fork $g$, with a roller 15, between its jaws; this fork comes up on each side of a projection $g^1$, on the under side of the hammer bar 7, the face of this projection $g^1$, is to be slightly curved, to take an even bearing on the roller 15, and the end is to be formed as an arc of a circle from the center of the hammer trunnions, and the fork $g$, is made with a hook 16, or may be an eye of sufficient size on each side, taking behind a pin through the projection $g^1$, the operation of this is, that as the hammer $f^1$ falls, the projection $g^1$, is carried toward the back of the machine, its pin taking the eyes 16, draws back the fork $g$, which, turning on its center 14, brings the roller 15, against the face of the projection $g^1$, see Fig. 4, and as the hammer rises, the roller 15, is forced forward, until the fork $g$, as it turns on its center, draws the roller 15, down below the lower edge of the projection $g^1$, see dotted lines Fig. 2, and this lower face being the arc of a circle from the center of the hammer trunnions, no more motion can be given to the roller 15, and fork $g$, however high the hammer may pass, as the motion given by this fork requires to be a certain amount, and no more.

We would here remark, that all the motions in the rest of the machine being taken from the hammer, in case of accident, if the hammer is held up by the hand, or otherwise, all the other motions are immediately suspended, which would not be the case, if the motions were taken from the main shaft $d$, although these motions may be taken from the main shaft, but we do not recommend it. The fork $g$, near the roller 15, receives a bolt $g^2$, which connects one end of an adjustable rod $h$, to the fork, and allows of the motion of each; this rod is to be adjustable in its length, by slots and screws, or similar means, and the opposite end is connected to the center pin of a click $i$, which is on a connecting bar 17, to the center vertical shaft $k$, carrying the main horizontal cam H. This shaft $k$, is set in a journal 18, on the end of the part $b$, of the frame, and the lower end of the shaft $k$, is turned smaller, and passes through a guide hole 19, in the frame $F^1$.

20, is a bush around the shaft, near the lower end supporting the weight of the cam, by the shoulder formed by the shaft being turned off smaller, to enter the guide hole 19, this bush 20, is sustained by screws, passing through the sides of an eye in the long horizontal supporting lever I, which is sustained by a fulcrum 21, on the frame E, see Figs. 2, and 3, the longer end of the lever is formed as a handle 22, and a spring latch 23, on the side of the lever I, is made with a thumb piece, near the handle 22, and a pin at the other end, passing through the lever, and entering holes in a plate $l$, attached to the side of the column C, and this plate $l$, has a guide arm $l^1$, outside the lever I, to keep the lever in place, but allow its vertical motion; the plate $l$, has three holes in it, one 24, in the center, one 25, above the center, and a third 26, below the center. It will now be seen, that when the pin of the spring latch 23, is in the hole 24, the cam H, stands in the central position, shown in Fig. 2, but when the pin of the latch 23, is withdrawn, by forcing the other end of the latch 23, against the lever I, the cam H, is either raised, or lowered, by the lever I, and retained in that position, by allowing the pin of the spring latch 23, to enter the holes 25, or 26, the object of this raising or lowering the cam will be explained hereafter.

The cam H, is formed with thirty two teeth around its edge, the teeth being thinner than the rim of the cam, as seen in Figs. 2, and 11, and the cam is formed as a thin wheel, connecting the hub with the rim, as seen in Fig. 11. It will now be understood from the foregoing, that the alternating motion given the fork $g$, by the motion of the hammer, causes the click $i$, to take up one tooth, each time, giving one complete revolution of the cam H, every thirty two blows, and to prevent the cam being drawn back, as the click $i$, is drawn back, we place a click $m$, with a spring on a pin 27, on the part $b$, of the main frame, the end of this click is formed wide, so as to take the teeth of the cam, whether the cam is raised up, or lowered down. The operation performed by this cam H, as hereafter set forth, tend, during part of the revolution, to rotate the cam in the direction in which it is turned by the click $i$, to prevent this, we attach a friction clamp $u$, set on a parallel pin 28, so as to allow the clamp to slide up and down, as the cam H is raised or lowered. This clamp is formed as a fork from the pin 28, the jaws of which lie above and below the rim of the cam, and a small projection against the periphery above the teeth, prevents the clamp from turning in, toward the center of the cam, by its rotation; and around each fork of the clamp we put leather, or similar substance, and have a screw 29, to give the requisite pressure, and cause sufficient friction to prevent the cam running partly round, but not enough to prevent the click $i$, from moving the cam the proper amount.

Around the shaft $k$, between the point $b$, and $F^1$, of the frame, we place an eye and set nut, with an arm $n^1$, which is adjusted to take (at the proper point of the revolution of the shaft $k$,) the pin $n^2$, of a latch 30, see Figs. 2 and 3; this latch 30, is so set on a center pin $n^3$, that the arms $n^1$, rotating with the cam H, turns it on its center $n^3$, until the partial rotation of the two releases the pin $n^2$, from the arm $n^1$, the center pin $n^3$, is set on the under side of the part $b$, of the frame, and also a spring 31, to replace the latch 30, to the required position, which is determined by a small pin in the frame $b$. On the frame $F^1$, are two journals 32, taking a cross shaft $o^1$, which receives, between its journals, a long lever $o$, so set, that when raised up, its end catches behind the latch 30, this lever is furnished with an arm $o^2$, passing through a slot, or mortise in the bed $F^1$, which slot is long enough to allow the arm $o^2$, to move about 80°, with the shaft $o^1$, and on the outside ends of the shaft $o^1$, are two cranks $p$, $p^1$, set at about an angle of 45°, with the horizontal line, at the time when the lever $o^2$, is behind the latch 30; the crank $p^1$, has a competent weight $p^2$, attached, and the crank $p$, receives on the crank pin, the vertical rod 34, which passes up to the parts that turn over the mold, as hereafter described. The lower end of the shaft $k$, that passes through the guide 19, in the frame $F^1$, has a crank $o^3$ on its lower end, set in the same direction as the arm $n^1$, and this crank $o^3$, has around its pin a thick washer, that takes one end of a chain, or catgut 33, that is attached to the eye on the end of the arm $o^2$, this chain 33, is adjusted to the length, between the eye on the arm $o^2$, at the time the lever $o$, is behind the latch 30, and the crank pin, at the time the pin of the crank is farthest away from the eye of the arm $o^2$. The object of this arrangement is, to give the shaft $o^1$, about the quarter of a revolution, with a very quick motion, and then replace the same slowly; by this means giving a very sudden pull on the rod 34. The operation is as follows; the shaft $k$, as it is rotated by the cam H, brings the arm $n^1$, just up to the pin $n^2$, as the hammer raises, and as it falls, taking up a notch on the cam, immediately that the hammer commences to raise again, and give the cam another partial rotation, the arm $n^1$, removes the latch 30,—and the chain 33, hanging loose at this point the lever $o$, falls by its own weight, in addition to the weight $p^2$, giving the shaft $o^1$, a very powerful and instantaneous motion, which is communicated by the crank $p$, and rod 34, to the parts that turn over the mold. The lever $o$, falling, moves the arm $o^2$, so as to draw the chain 33 tight, or nearly so and the cam H, progressing a notch, at each blow of the hammer, rotates the crank $o^3$, pulling on the arm $o^2$, until the crank pin reaches its farthest point from the eye of the arm $o^2$, at which time the lever $o$, has been raised, so as to take the face of the latch 30, removing it, and passing behind the lip of the latch; the spring 31, returning the latch 30, so as to hold up the lever $o$, until again disengaged by the arm $n^1$; the cam H, in completing its rotation, brings the crank $o^3$, on the side toward the arm $o^2$, slackening the chain 33, ready for the previously described operations to be again performed. A stop block may be placed, to catch the lever $o$, when it has fallen to the proper point, thereby taking the strain off the chain 23, and a block may also be set under the weights $p^2$, to receive them, and prevent the sudden stoppage straining the crank $p^1$. These blocking pieces are not shown, to avoid complexity.

The parts that hold and turn over the mold, consist of a frame $s$, which is made to receive the parts that move the mold horizontally, as hereafter described; and this frame $s$, has small projections, which we form by the head of a steel screw in the under side, which slide on the anvil, relieving the friction of the parts. This frame $s$, has two small bearings $r^1$ on the back angles of the frame, which receive a small cross shaft $r$, which has two crank arms 35, secured permanently to the shaft $r$, and the outer ends of these crank arms 35, are jointed at 36, to the arms 37, of the mold frame $t$, this frame $t$, being formed as shown, so as to allow of a parchment or other band being slid on to hold the mold in the place marked $t^1$, Fig. 1, and a proper filling is to be placed between the frame $t$, and the mold, so as to retain the mold in place, if it should be too small to fill the frame $t$. The arms 37, have each a pin 40, taking the slotted end of a connecting link 38, which is attached by a pin 39, to the frame $s$, on the cross line of the center of the mold frame $t$. $q$, is a lever, set on the shaft $r$, between one crank 35, and the bearing $r^1$, on a round part of the shaft $r$, so that the lever $q$, is allowed to turn on the shaft; this lever $q$, takes on its extremity, by a fork and pin, the upper end of the rod 34. On the side of the lever $q$, are supports to receive a sliding latch 41, with a spring around it, to press the point of the latch toward the shaft $r$, so as to take above a projection $t^2$, behind one of the crank arms 35. The latch 41, has a pin 42, secured in it, which passes through a slot in the lever $q$.

$t^3$, is a fork, coming up on each side of the lever $q$, taking the pin 42. The faces of this fork are formed as a curve, increasing in distance from the center of the shaft $r$. This fork $t^3$, is supported by a plate $t^4$, screwed to the frame $s$, and extending inward, toward the frame $t$, and having near its inner end, a screw 43, which is so set, as to take the under side of the crank 35, and by its height, determine the position which the cranks 35, descend to.

+, is a spiral spring around the shaft $r$., one end of which is attached to one crank 35., the other end attached to the frame $s$., and this spring is to be partially unwound, or wound up, so as to tend to face the ends of the cranks 35., toward the anvil, and the spring must be adjusted, to give the proper amount of operative force, to effect the object hereafter specified.

The operation of these parts is as follows, reference being had to Figs. 1, 2, and 6. The rod 34, having the very sudden motion given to it at each rotation of the cam H., as before described, the moment the hammer commences to lift, pulls on the lever $q$., drawing it down, and by its latch 41., taking the projection $b^2$., gives the shaft $r$., about one sixth of a revolution, and as the lever $q$., descends, the pin 42., taking the fork $t^3$., withdraws the latch 41 from the projection $t^2$., the fork $t^3$ being so shaped, as to effect this at the right point. The partial rotation of the shaft $r$., lifts the cranks 35., and by the joint 36., to the arms 37., in the center line of the frame $t$., lifts the frame $t$., up, which if no other force operated on it, would be lifted bodily up, which is the case, until the pins 40., take the ends of the slots in the links 38., which turn on their center 39., drawing down one edge of the frame $t$., giving it a rotary movement on the joints 36., until the pins 40., come into the line of the centers of the joints 36, and 39, and at this movement the latch 41, being disengaged from the projection $t^2$., the spring +, comes into operation to force the cranks 35., down toward the anvil, which carries the joint 36., down, and the momentum of the mold frame $t$., places the pins 40., the other side of the center line, and the mold is returned to place, the side resting on the anvil, which was previously upward, and the link 38., being the other side of the central line, ready to turn the mold back again, replacing the mold with one face on the anvil in its previous position. We would here remark, that the parts will fall onto, and resume their proper position on the anvil, without the spring +., but we have found by experiment, that the semi-rotation, given by the sudden operation of the rod 34, to the mold frame $t$., causes what is the highest and quickest moving edge, in turning over, to strike with a blow on the anvil, unless the center is forced down at the same time, so as to cause the mold to come down flat on the anvil.

The operation of replacing the lever $o$., previously described, causes the rod 34, to rise, carrying with it the lever $q$., the beveled side of the latch 41., taking under the projection $t^2$., is forced in, against the operation of its spring, until the point of the latch rises above the face of the projection $t^2$., when the spring forces the latch 41., into place again, ready to operate as before.

The object of the screw 43., under the crank 35., is this: Some molds are thicker than others, and the "plane" is considerably thicker than the frame $t$., this screw 43., taking the crank 35., prevents the joint 36., falling down onto the anvil, thereby the frame $t$, is sustained, and adjusted, so that whichever side the mold is upwards, the same width of the mold is left, above and below the frame $t$, which prevents the mold $t^1$ from being knocked out of the frame $t$, on coming down into the anvil.

*Fourth—The means to regulate, and extend the area, on which the blows of the hammer operate.*—44., is a jaw on the frame $s$., forming a center for an × formed parallel motion $u$., composed of two bars, jointed in their center, one end of one bar being jointed at 44., and one end of the other bar sliding between jaws $u^1$, on the frame $s$., with a pin in a slot through the jaws $u^1$, the other two ends of these bars pass under, and have pins 45, sliding in a slot in a bar $u^2$, which is slightly raised from, and secured to the anvil, parallel to its front edge, the object of these parallel motion bars is, to allow the frame $s$., to move in any direction, but always keep its edges parallel with the edges of the anvil, and with the bar $u^2$., and the sizes of these parts must be such as to allow sufficient motion to be given to the mold, to cause the hammers to fall near the edges of the mold.

On the right side of the frame $s$, (these terms being applied, as they would be, to an attendant standing facing the machine, at the front of the anvil,) we have a plate attached, or formed with the frame $s$., which has a slot 46., running parallel to the edge of the anvil, and a similar slot 47, in the back of the plate or frame $s$, at right angles to the slot 46.; the slot 47, receives the pin 48., of a right angle crank $v$., which is set on a step 49., on the back edge of the anvil D., forming the fulcrum, and the other arm $v^1$, of the right angle crank extends toward the front of the machine, and takes, by a slightly elongated hole, the pin 55, of the left side lever $x$., which is made nearly or quite parallel in its shape, and passes through an adjustable fulcrum 53., and near the end of this lever $x$., is a pin 61., which communicates a definite motion to this end of the lever $x$., and moves it, at the right time, by means and as hereafter described. The slot 46., receives the pin 54., on an arm $w^1$., of the parallel lever $w$., which has a pin 56., to which the moving power is applied, and 53., are two fulcrums, each of which receives one of the levers through it. These fulcrums 53, are made as a block with a mortise through it, that receives the lever, and allows it to slide freely; and on the under side of each fulcrum box, is a trunnion, passing through a hole in a slide $v^4$., where it is secured, but allowed to turn by a nut, see Fig. 12., which represents a section of the slide $v^4$., and fulcrum.

All around the edge of the anvil D, is a deep groove, for the purpose of catching any particles of gold, that may be blown out from between the skins of the mold, by the operation of the hammer, on the air between the skins; there will be more or less of this, and with a brush, it is to be drawn together, and removed. And next outside this groove, on the right and left side of the anvil, is a groove $v^3$, receiving by slide grooves in the sides, the slides $v^4$, see Fig. 7, these slides $v^4$, have teeth on their under side, which take a pinion 50, one under each slide, and both pinions are set on a shaft 51, supported in bearings 52, and passing through a hole in the column $c$, with a crank handle $v^5$, by which the pinions are rotated. The parts that take the pin 56, of the lever $w$, and the pin 61 of the lever $x$, prevent the levers moving endwise, and give them a definite movement, at the proper time, as shown hereafter, if the fulcrums 53, are set, by moving the slides $v^4$, by the pinions 50, and crank handle, so as to stand in the center of the length of the levers, $w$, and $x$, between the pins 54, and 56; and 55 and 61, then any motion, given to the levers $w$ and $x$, by the pins 56, or 61, will give a motion to the mold, of the same extent; and by bringing the fulcrums 53, nearer to the pins 54, and 55, the motion will be less, being proportioned to the length of the levers on each side of the fulcrum, so that with a given motion to the pins 56, and 61, a motion can be produced on the mold, from almost nothing, up to as much, or more motion, than is given to the pins 56 and 61, by merely sliding the fulcrums along; and the levers $w$, and $x$, when in their quiescent position, being parallel with the slides $v^4$, the moving of the fulcrums does not alter the position of the mold, in the least degree, so that by thus adjusting the positions of the fulcrums, we are enabled to move the mold a greater or less amount, thereby either increasing, or decreasing the area of the part of the mold, on which the hammer operates, so as to follow up the extension of the leaf, or lamina of metal, without beating outside the edge of the same.

*Fifth.—The means to cause the blows of the hammer to be properly distributed over the mold.*—The pin 56, of the lever $w$, connects to one end $w^2$, of a right angle crank, the angle of which forms a fulcrum 57, and the other arm $w^3$, extends to the center line of the machine, terminating with a hole. formed slightly elongated, to receive the pin 60. On the center pin 57, beneath the right angle crank $w^2$, we place a spring $w^4$, formed as a fork, the butt of which, setting on the pin, 57, allows the spring to turn; the points of the fork take a pin 58, depending from the under side of the crank $w^2$, and also a pin 59, set in the part 3, of the frame; it will be seen, that any power, operating by the pin 60, to move the crank arms $w^3$, and $w^2$, moving the pin 58, in either direction, the pin takes one side of the fork of the spring, the other side setting against the pin 59, opening the fork, which, turning on the center 57, takes an even bearing, and by this means, a very strong spring can be used, at the same time allowing of considerable motion, as both sides bend, in aid of the springing, and when no power is operating to bend the springs, the sides of the fork come together, on each side of the pins 58, and 59, bringing the lever $w$, parallel with the center line of the machine, and in the line of the slides $v^4$. The lever $x$, is fitted in a similar manner, the lever being extended beyond the pin 61, to receive a pin 62, depending from its under side, taking the points of the spring $x^1$, which is set on a fulcrum 63, and has a pin 64, between its points, entering the part 65, of the frame 3, this spring $x^1$, operates precisely the same, as the spring $w^4$, and returns the lever $x$, parallel to the lever $w$, when not otherwise acted on.

$y^1$, is a slide, formed at a right angle running from the under edge of the bed $c$, on the central line of the machine, toward the cam shaft $k$, beneath the cam H, and then passing to the left of the machine, at right angles from the center, on the cross central line of the cam shaft $k$, to the under side of a supporting arm 65. And $y$, is a similarly formed right angle slide, placed above the cam H, and the slides $y$ and $y^1$ are secured together, by a bolt 67, to the bed plate $c$, and by a bolt 66, to the arm 65, of the frame. The width between these slides is the proper amount, and their position such, that the cam H, shall stand central between them, when the latch 23, taking the hole 24, supports the cam at the central point. These slides $y$, and $y^1$, are formed with a mortise, or opening, running lengthwise, the sides of which are beveled, to form a V, and each of these mortises receives a roller 68, that has through its center a pin, with a small thin roller, see Fig. 11, the pin of each of these rollers screws into, and is secured in, one end of a sliding fork 70, one fork being on the back, and another on the left side, between the slides $y$, and $y^1$. The other end of these forks forms the joints for the pins 60, and 61. These forks stand so, as to be above and below the cam, and carry the rollers 68, with their pins and rollers, and these forks 70, are guided near their outer ends, in and between the mortises of the slides $y$, and $y^1$. The rollers that are on the pins of the rollers 68, are marked 71, on the top fork of the slide 70, at the back of the machine, and 72, on the lower fork 73, is the roller on the top of the fork 70, on the left side and 74, the roller on the bottom of the fork.

$z$, is a circular plate, let into and secured in the recess, in the top side of the cam H, and $z^1$, is a similar plate, secured in the recess in the under side of the cam. In these plates, grooves are formed, passing through each plate to the body of the cam H, and these grooves are of a proper distance from the center, to give the right motions, as hereafter described. It will be seen, that when the cam stands in the vertical central position, shown by full lines in Fig. 11, the cam can rotate without touching the rollers 71, 72, 73, or 74; but when the cam is raised by the lever I, so that the latch 23, takes the hole 25, the cam H, then stands in the position shown by dotted lines in Fig. 11, receiving into the slot or groove 75, in the plate $z$, the rollers 71, and 73, and when the lever I, is lowered, the cam H, stands as shown by blue dotted lines Fig. 11, the groove 76, in the plate $z^1$, receives, and operates on, the rollers 72, and 74. This being the construction of the parts, their operation will be seen, by reference successively to Figs. 8, 9, and 10, which show the way the cam moves the mold, so as to make the hammer fall on the right points, for beating the " center motion," the " diagonal motion," and the " planing motion."

Fig. 8, shows the form of the groove, which we usually make in the upper plate, for beating the " center motion," and also the lines, illustrating the motions of the parts, so as to make the hammer fall in the positions denoted on the mold, the teeth, and blows, being numbered from 1, to 8, so that whichever tooth of the cam is on the center line of the machine, the operation of the cam, on the rollers 71, and 73, is such, as to cause the mold $t^1$, to be placed in the position to receive the blows of the hammer, denoted by the corresponding number on the mold. The cam H, being rotated one tooth at a time, in the direction of the arrows, and the parts being so adjusted, that the motion of the hammer lifting, moves each successive tooth up to the central line, the slides $y$, and $y^1$, standing one on the central line, and the other at right angles, every tooth comes successively into the center line of the slides, and to explain the motions, we will commence with the cam in its present position, and follow the successive motions around, and show their operations on the mold. The face of the cam is divided into three parts, or circles, the center one being about equidistant, between the cam shaft and the points of the teeth and the length of the forks 70, is such, that their rollers are over this central line, at the time the springs have brought the levers $w$, and $x$, parallel to the central line of the machine, which brings the center of the mold immediately under the center of the hammer, when it falls, and the cam is further laid off correctly, by two circular lines, equidistant inside and outside the central line, as much, or about the distance from the center of the mold, to its edge; and the lines, drawn from the point of each tooth to the center, illustrate the mode of laying out, and show the points, at which the rollers 71, and 72, stand, in the slot 75, at each successive blow of the hammer. The mold, being square, has to be beat in quarter sections, returning, every eighth blow, to the center, so there are four points around the cam, when it can be raised up, so that the groove 75, takes the rollers 71, and 73, as shown in Fig. 8; at this point all the parts stand stationary, and the hammer falling, strikes the mold in the center, and on raising, moves the cam the amount of one tooth, the groove 75, now operates on the roller 71, to draw it toward the center, which, through the right angle crank $w^2$, $w^3$, moves the pin 56, to the right and the lever $w$, turning on its fulcrum 53, the pin 54, is moved to the left, moving the mold and frame, bodily, with it; the slot 47, sliding along on the pin 48, and the parallel motion bars $u$, sliding in the slots in the bar $u^2$, places the mold to receive the blow on the point 2, (the slot 75, being the arc of a circle from the point 1, to the point 4, of the cam, does not move the pin 73,) and this movement of the lever $w$, is continued, until the hammer has struck its fourth blows, when the roller 71, comes in the slot 75, to its nearest point to the cam shaft, which slot is here the arc of a circle from the center, between the points 4, and 8, the roller 71, is merely held in that position, while the roller 73, comes into play, the slot 75, forcing it out from the center, moves the pin 61, to the left, the lever $x$, turning on its fulcrum 53, its pin 55, is moved to the right, which causes the arms $v^1$, and $v$, to move, removing the pin 48, toward the back of the machine, opening the parallel motion bars $u$, and sliding the slot 47, on the pin 46, until the cam has moved to the point 5, and the hammer falls on the mold, at the point denoted by the corresponding number, thus the cam, in its rotation, proceeds until the eighth blow is struck, near the corner of the mold. At this time the levers $w$, and $x$, stand in the positions denoted by dotted lines in Fig. 8, with the springs $w^4$, and $x^1$, (Fig. 1,) nearly fully extended, and on the hammer rising, and moving the cam, the roller 73, rolls down the incline between the points 8, and 1, toward the center of the cam, by the operation of the springs $x^1$, bringing the lever $x$, parallel to the center line of the machine, at the same time the roller 71, rolls on the similar incline, between the points 8 and 1, out from the center of the machine, bringing the lever $w$, also parallel to the center of the machine, which brings the mold, so as to receive the blow of the hammer on the center again; the roller 71, now being in the part of the slot previously occupied by the roller 73. By following the line of the slot 75, it will be found to be so formed, as to cause the blows to fall on the mold, in the places denoted by the corresponding numbers, thus proceeding to the place of beginning, at which moment, the "turn over" motion, previously described, is set so as to come into operation, and turn the mold over, when the hammer will fall on the opposite side, on the same points, from one to four, and bring the other side up the mold receives the blows from five to eight, in the position denoted by the small dotted circles on the mold.

It will be understood, that this "central beating" is brought into operation, by raising the cam H, after the hammer has been allowed to beat on the center of the mold a sufficient length of time, the same as in the hand process, with the cam standing in its central position, working the "turn over" but not moving the levers $w$, and $x$, or parts attached,—the workman brings this "central beating" into work, for the purpose of carrying out thick corners as before described, and when this has been in work a proper length of time, he brings the "diagonal beating" motion into operation, to extend the corners and beat the leaf of metal out, nearly square, and even in thickness, by lowering the cam, so that the groove 76, in the plate $z^1$, takes the rollers 72 and 74. But according to the character of the metal, so, in the operations, either mode of beating may be brought, successively, into play, as required by circumstances. The formation of this groove 76, in the plate $z^1$ is shown in Fig. 9, with the operations, and in this figure, the plate $z^1$ is shown in plan, from above, as with the body of the cam removed. Starting from the point 1 on the cam, as before, the blow falls on the center, and the cam moving to the point 2 the roller 72, is drawn inward, moving the pin 56, to the right, and the pin 54, to the left, and, at the same time, the slot 76, moves the roller 74, to the left, carrying the pin 55, to the right, and the pin 48, toward the back of the machine, these two operating together, make the blow fall on the point 2, on the diagonal line from the center to the corner of the mold; the slot thus proceeding to operate on the rollers 72 and 73, causes the blows 3, and 4, to be given in the diagonal line, when the roller 72, coming into the inner part of the slot 76, between Nos. 5, 6, 7, and 8—which is the arc of a circle to the center—remains stationary, while the roller 74, is drawn into the center, moving the pin 55, to the left, and the pin 48, toward the front, causing the blows 5, 6, 7, and 8, to fall on the line of the side, in the positions denoted by the corresponding numbers on the mold, when the springs $x^1$, and $w^4$, return the mold to the center, and thus the groove 76, continues to operate, until each quarter of the mold is beaten, the blows falling in the positions denoted by the corresponding numbers. With these motions, and diagonal beating, the "mold" is completed, the Figs. 8, and 9, representing, for convenience of illustration, the fulcrums 53, at the center of the length of the levers $w$, and $x$, but, as before described, when the hammer has been allowed to beat in one spot in the center, the same as by hand, the fulcrums are to be drawn by the handle $o^5$, as near to the front end of the levers, $w$, and $x$, as possible, so as to cause the beating to be on a small area, and then by moving the fulcrums, from time to time, toward the center of the levers, the area of beating is extended, as the leaf of metal is enlarged, but it is to be distinctly borne in mind, that the same number of blows are struck, and in the same proportionate distance, and position, from each other, the area of the blows being enlarged, or diminished, as a whole.

The whole process of beating leaves a lamina of metal, is not complete, without the means to effect the beating of the "plane," which is the preparation of the skins, as before described, which requires a motion to beat all around the edge, beating about thirty-two blows, each on each side. To effect this, we use precisely the same machine, with the exception, that the slot in the plate $z$, is differently shaped; we may either have another cam, to place in the same machine that performs the other operations, or a separate machine, precisely similar, may be used to beat the "plane." The under plate $z^1$, of the cam, is precisely the same as before, for the "diagonal beating" the groove in the upper plate being shown in Fig. 10.

It will be seen, that to enable us to raise the cam up, at either of the points 1, to take the rollers 71, and 73, we have to put in two secondary grooves 78, which run on the central circular line of the cam, till they intersect the groove 77, these grooves 78, being no use, after the cam has made a quarter of a revolution; we now suppose the roller 73, to be in the slot 77, on the line of the point 1, the slot, at this point, being nearest the cam shaft, and the arc of a circle, the quarter of the cam from the points 5, to 5, the roller 71, at the same time, being on the center line, the roller 73, has drawn the pin 55, to the left, moving the pin 48, to the front, so that the blow 1, is struck on the center, near the rear side of the "mold," the cam progressing, draws the roller 71, toward the center, moving the mold to the left, till the fifth blow is struck on the corner, when the pin 71, coming in to the slot 76, where it is the arc of a circle, the pin 71, remains stationary, the pin 73, being at the same time taken by the slot, is removed toward the edge of the cam, moving the pin 55, to the right, and the pin 48, toward the back, causes the blows 6, 7, 8, 1, 2, 3, 4 and 5, to be struck on the line of the second side, when the pin 73, enters that part of the slot 77, which from 5, to 5, is formed as an arc of a circle, near the edge of the cam, the roller 77, being now operated on, is forced from the inner to the outer slot, moving the pin 54, to the right, beating 6, 7, 8, 1, 2, 3, 4, and 5, blows on the third side of the "mold." The slot 77 again taking the pin 73, draws it inward, moving the pin 48, toward the front of the machine, beating the fourth side, striking the blows denoted by Nos. 6, 7, 8, 1, 2, 3, 4, and 5, when the slot taking the roller 71, places the "mold" to receive the blows 6, 7, and 8, bringing the cam H, to the place of beginning, under the rollers 71 and 73. The adjustment of the fulcrums 53, producing the same effects as before detailed, and the "diagonal" is to be brought into work when required.

Having thus described the machine, with its consecutive operations, and detailed the effects of each successive part, we do not deem it necessary to describe the operation of the machine, as a whole; suffice to say, that it produces, by a little attention, precisely the same effects as those described, as being performed by hand, and works in harmony, the hammer being propelled the requisite number of blows per minute, the "turn over" is effected between the blows of the hammer, with unerring certainty, by the sudden means herein described, and when the "central diagonal" or "planing" motions are in work, the turn over operates as before, and by watching the time when the turn over is made, the cam can be either raised, or lowered, at each quarter point of the motion, without stopping the machine, and the mold is "rifled", when required, as in the hand process, by being removed from the frame $p$.

*Sixth—Variations.*—In the means of working the hammer, we may use a cam with more than two points to raise the hammer, and the spring $f^2$, instead of being stationary, we have had made, so as to be raised up, and then brought to bear suddenly, when the hammer was up, to prevent the spring operating on the handle, till it was fully raised, and then suddenly disengage the spring, and allow it to come down with its full force, to send the hammer down, but this we find does not answer so well as that herein described and shown.

Variations may be made in the means for turning over the mold, two rods may be used, instead of one rod 34, and the cranks 35, disconnected from the shaft $r$, and latches put on each lever, to disconnect the parts, and allow them to turn over, or a semi rotary movement may be given to the shaft $o^1$ so as to draw down, and then push up on the rod 34, without the latch 41; but the means herein shown are, we believe the best for the purpose herein described; but we are not aware of any mechanical means being used, to raise the mold from the anvil, and simultaneously, or subsequently turn the same, and replace it with the opposite face resting on the anvil, before we accomplish the same.

The cam H, as before noted, may be made to rotate with a greater or less number of blows of the hammer than thirty two; although we believe this number best adapted for the purpose; and the plates $z$, $z^1$, instead of being formed with a groove, may have a projection, or bead, which will produce the same effect, and the cam H, instead of being circular and flat, may be made as a cylinder, or in separate cams, although we do not recommend the same; and it will be seen, that the main feature of our cam is, that one groove, operating on slides and rollers, set at right angles to the center, and to each other, moves the "mold," so as to operate on the four quarters, successively, which would not be the case, were the slides set opposite or at 180° to each other, on the cam; and the forks 70, instead of being sustained by the guide slides $y$, $y^1$, may be made with slides on the ends of themselves, passing through slides in the frame, without the rollers 68, although we prefer that here shown.

The hammer handles we prefer to be made of wood; and the fulcrums 53, may be adjusted by screws, instead of the rack and pinions 50; or the levers $w$, and $x$, may be arranged in any other manner, so as to produce a greater or less motion on the "mold" from a given motion of the cam, or its equivalent.

The arrangements of the side levers and springs may be changed, to bring the left side to the right; and vice versa. And the lever I, may be moved up and down, by a screw, or other means, although we believe the arrangements shown to be the best.

*Seventh—Disclaimers and claims.*—We do intend to confine, or limit ourselves, to the application of these means to beating lamina, or leaves of metal, but to use this machine to beat any article to which it may be applicable; for instance, the "turn over" motion may be applied to a plate, or similar article or articles, that require to be beat on both sides; and the arrangement herein shown of means for extending, or decreasing a given motion, may be applied to move any article, in the given direction, and extend, or decrease the area of such motion; as required; and it will also be seen, that this means of taking motion from the motion of the hammer tail, to give a definite motion from an uneven or varying motion, may be employed in other machines, for the like purposes; and we do not intend to limit ourselves to the sizes, or proportions of the parts, nor their precise arrangement relatively with each other, but to vary these, as circumstances may require.

We do not claim the hammer, or the means of moving or actuating the same; neither do we claim the use of cams to move the mold. But What we desire to secure by Letters Patent of the United States is—

1. We claim the arrangement and application of the vibrating fork $g$, to take a definite amount of motion from the vibrating part $g^1$, of the hammer, for the purposes and as described and shown.

2. We claim lifting the "mold" or its equivalent from the anvil, and simultaneously or subsequently turning the same, by competent mechanical means substantially, such as herein described or their equivalents, so that it is replaced with the side that was previously on the anvil, exposed to the blows of the hammer.

3. We claim the arm $n$, 1, latch 30, levers $o$, and $o$, 2, chain 33, and crank $o$, 3, or their equivalents in combination with a weighted arm or its equivalent whereby a sudden partial rotation is given to the shaft $o$, 1, and then the lever $o$, is returned behind the latch 30, for the purposes, and as described.

4. We claim in combination the lever $q$, latch 41, cranks 35, frame $t$, and links 38, or their equivalents, whereby the "mold," or its equivalent, is lifted from the anvil, turned, and replaced as described.

5. We claim the application of the rollers 71, 72, 73 and 74 or other suitable mechanical means, set and moving at right angles with each other, and to the center of the cam shaft, to take, and communicate, the motion given by a properly formed groove, or bead, in or on the face of the cam H, to the mold, so as to place it in the proper position to receive the blows of the hammer to beat each successive quarter of the mold as described and shown.

6. We claim moving the mold or its equivalent over areas of different size by means of the same cam through the agency of mechanical contrivances supstantially such as herein described, applied to the devices which transmit motion from the cam to the mold.

7. We claim the arrangement of the slides $y$, $y^1$, rollers 68, forks 70, with the cranks $w^2$, $w^3$, and $v$, $v^1$, and levers $w$, and $x$, to communicate the motion given by the cam H, to the rollers 71, 72, 73, and 74, to the "mold," through its frame $s$, substantially as described and shown.

8. We claim the adjustable fulcrum 53, and slides $v^4$, in combination with the levers $w$, and $x$, for the purposes specified.

9. We claim the parallel motion bars $u$, and slotted bar $u^2$, in combination with the slots 46 and 47, in the frame $s$, whereby the "mold" and frame has a free motion, at the same time that it is kept parallel with the sides of the anvil, or the slotted bar $u^2$.

10. We claim the arrangement of the forked springs $w^4$, and $x^1$, and pins 58, 59, and 62, 64, or their equivalents, as applied to the purpose of returning the "mold" to its central position, when commencing to beat each quarter of the "mold," as described and shown.

In witness whereof we have hereunto set our signatures this first day of November one thousand eight hundred and fifty-one.

ROBERT B. RUGGLES.
LEMUEL W. SERRELL.

Witnesses:
GEO. W. REID,
CHARLES TINSELENT.